(12) United States Patent
Chang

(10) Patent No.: US 11,237,465 B2
(45) Date of Patent: Feb. 1, 2022

(54) OPTICAL MODULE AND PROJECTOR WITH SAME

(71) Applicant: Coretronic Corporation, Hsin-Chu (TW)

(72) Inventor: Yi Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 476 days.

(21) Appl. No.: 16/205,225

(22) Filed: Nov. 30, 2018

(65) Prior Publication Data

US 2020/0174350 A1    Jun. 4, 2020

(51) Int. Cl.
*G03B 21/14* (2006.01)
*H02K 41/035* (2006.01)

(52) U.S. Cl.
CPC ....... *G03B 21/142* (2013.01); *H02K 41/0356* (2013.01)

(58) Field of Classification Search
CPC .......................... G03B 21/142; H02K 41/0356
USPC ......................................................... 353/22
See application file for complete search history.

(56) References Cited

U.S. PATENT DOCUMENTS

2019/0196308 A1* 6/2019 Chang ................ G03B 21/14
2019/0278102 A1* 9/2019 Suter ................. G02B 27/646

FOREIGN PATENT DOCUMENTS

TW         201813261         4/2018

\* cited by examiner

*Primary Examiner* — Jerry L Brooks
(74) *Attorney, Agent, or Firm* — JCIPRNET

(57) ABSTRACT

An optical module including a base, an outer frame, an inner frame, a transparent element, two first coil portions, two first magnetic portions is provided. The outer frame is pivoted to the base. The inner frame is disposed in the outer frame. The transparent element is disposed in the inner frame. The first coil portion is disposed between the base and the outer frame. The first magnetic portion is disposed between the base and the outer frame, and each of the two first magnetic portions is spaced with the corresponding first coil portion. When a power supply is adapted to provide a current to the first coil portion, each of the two first coil portions is magnetized and forms an electromagnetic force with magnetic field of the corresponding first magnetic portion, and the electromagnetic forces are adapted to drive the transparent element pivotally swinging relative to the base.

19 Claims, 4 Drawing Sheets

OPTICAL MODULE AND PROJECTOR WITH SAME

BACKGROUND

Technical Field

The disclosure relates to an optical module, and in particularly, to an optical module applied to projector.

Description of Related Art

The projector is a display device for producing large size images. The imaging principle of the projector is to transform an illumination beam produced from a light source to an image beam by using one or more light valves, and the image beam is projected to a screen or a wall by a projection lens.

In the conventional projector product, the resolutions of images transformed by the light valve have gradually mismatched the market demand. To further increasing the image resolution, the light valve with high resolution is applied in the projector, but the manufacturing cost of the projector is high. In addition, in other types of projector, an additional optical module having optical vibration technology is disposed in the projector to promote the resolution of the image transformed by the light valve.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an optical module and projector with same that can reduce the power consumption and reduce the volume of the projector.

The optical module including a base, an outer frame, an inner frame, a transparent element, two first coil portions, two first magnetic portions is provided. The outer frame is pivoted to the base. The inner frame is disposed in the outer frame. The transparent element is disposed in the inner frame. The two first coil portions are respectively disposed between the base and the outer frame. The two first magnetic portions are respectively disposed between the base and the outer frame, and each of the two first magnetic portions is spaced with the corresponding first coil portion. When a power supply is adapted to provide a current to the first coil portion, each of the two first coil portions is magnetized and forms an electromagnetic force with magnetic field of the corresponding first magnetic portion, and the electromagnetic forces are adapted to drive the transparent element pivotally swinging relative to the base.

A projector includes a light source, a light valve, a projecting lens, and an optical module. The light source is adapted to provide an illumination beam. The light valve is located on a transmission path of the illumination beam. The light valve is adapted to transform the illumination beam into an image beam. The projecting lens is located on a transmission path of the image beam. The projecting lens is adapted to project the image beam. The optical module is disposed between the light valve and the projecting lens. The optical module includes a base, an outer frame, an inner frame, a transparent element, two first coil portions, two first magnetic portions. The outer frame is pivoted to the base. The inner frame is disposed in the outer frame. The transparent element is disposed in the inner frame. The two first coil portions are respectively disposed between the base and the outer frame. The two first magnetic portions are respectively disposed between the base and the outer frame, and each of the two first magnetic portions is spaced with the corresponding first coil portion. When a power supply is adapted to provide a current to the first coil portion, each of the two first coil portions is magnetized and forms an electromagnetic force with magnetic field of the corresponding first magnetic portion, and the electromagnetic forces are adapted to drive the transparent element pivotally swinging relative to the base.

Base on the above, the optical module of the invention includes two first coil portions and two first magnetic portions, and each of the two first magnetic portions is spaced with the corresponding first coil portion. The first coil portion is respectively faced to corresponding first magnetic to effectively combine the first magnetic portion and the first coil portion to maximize the electromagnetic forces with low power consumption. In addition, the optical module of the invention could promote the resolution of images by swing the transparent element relative to the base, so as to reduce the power consumption and the volume of the projector.

To provide a further understanding of the aforementioned and other features and advantages of the invention, exemplary embodiments, together with the reference drawings, are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
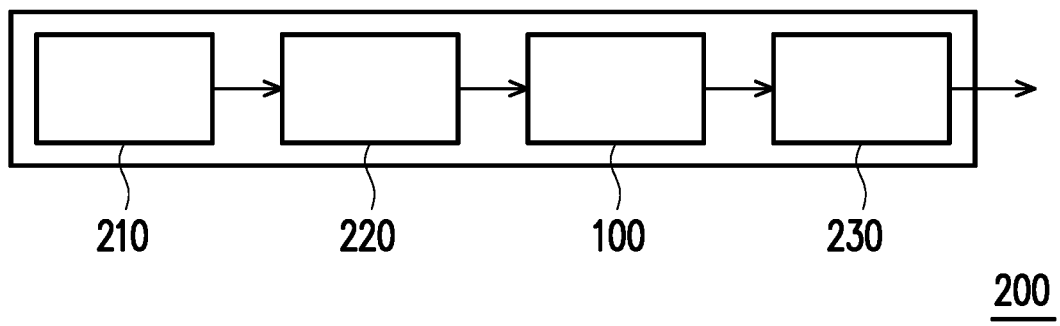
FIG. 1 is a schematic block diagram of an optical module according to one embodiment of the invention applied in a projector.

FIG. 1 is a schematic block diagram of an optical module according to one embodiment of the invention applied in a projector.

Referring to FIG. 1, a projector 200 of the embodiment includes a light source 210, a light valve 220, and a projecting lens 230. The optical module 100 is disposed between the light valve 220 and the projecting lens 230. The light source 210 is adapted to provide an illumination beam. The light valve 220 is located on a transmission path of the illumination beam. In detail, the light valve 220 is adapted to transform the illumination beam into an image beam. The projecting lens 230 is located on a transmission path of the image beam. The image beam is adapted to pass through the optical module 100 and a resolution of the image beam is promoted (increased) by the optical vibration technology of the optical module 100.

Figure 2A:
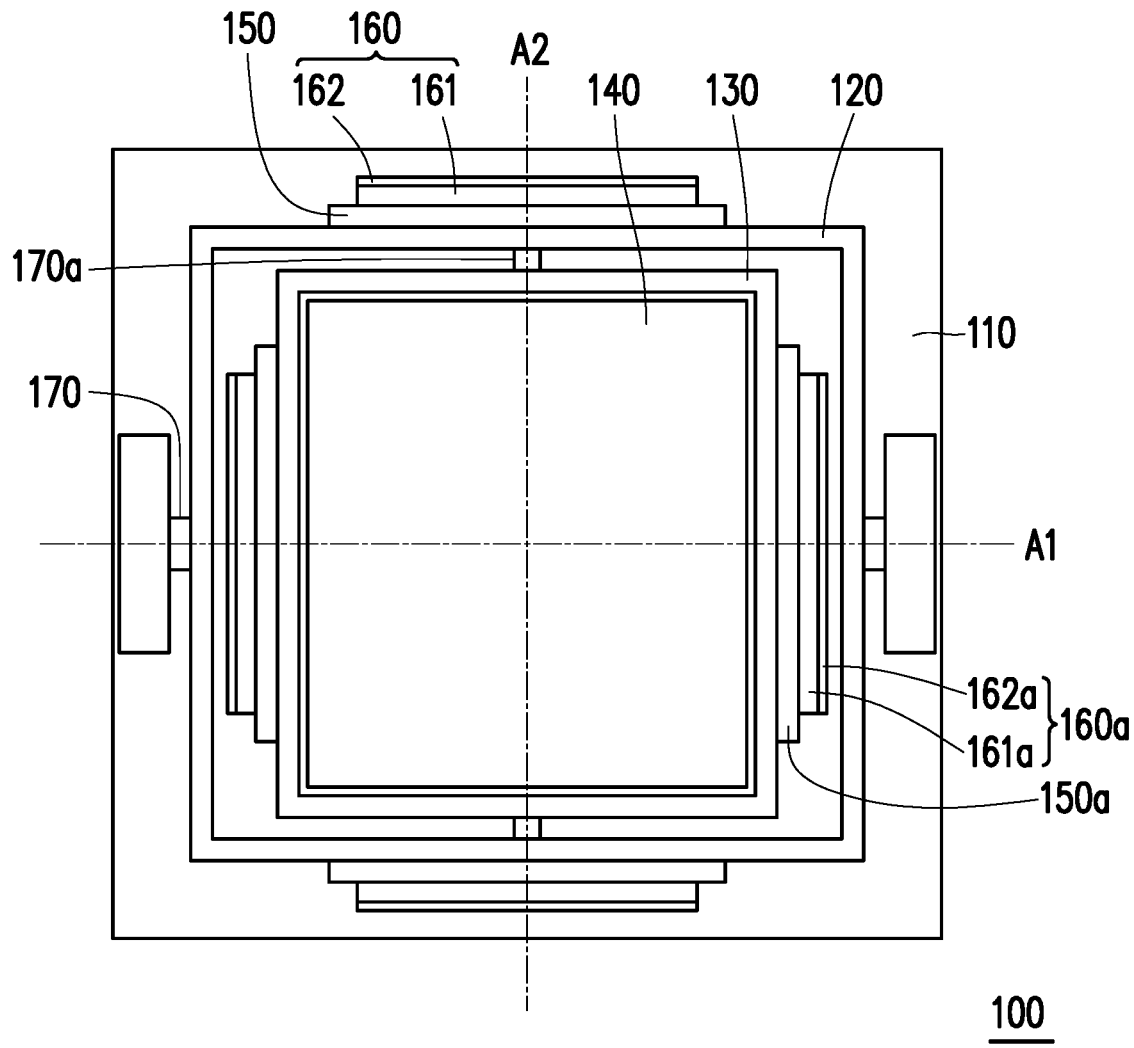
FIG. 2A illustrates a schematic diagram of the optical module of FIG. 1.
Figure 2B:
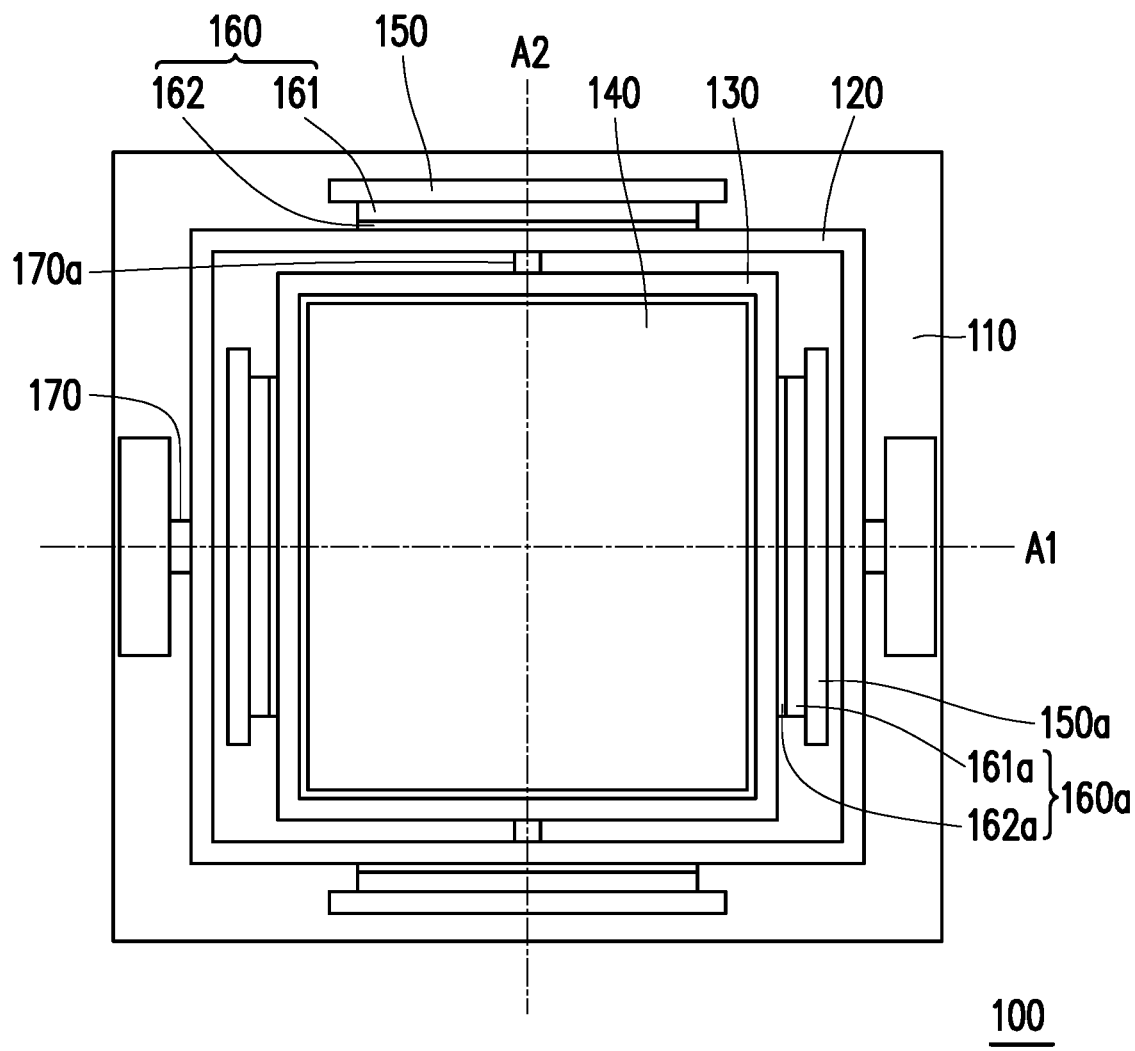
FIG. 2B illustrates a schematic diagram of the optical module according to another embodiment of the invention of FIG. 1.

FIG. 2A illustrates a schematic diagram of the optical module of FIG. 1. FIG. 2B illustrates a schematic diagram of the optical module according to another embodiment of the invention of FIG. 1.

Referring to FIGS. 1, 2A, the optical module 100 including a base 110, an outer frame 120, an inner frame 130, a transparent element 140, two first coil portions 150, two first magnetic portions 160, two second coil portions 150a, and two second magnetic portions 160a.

The base 110 is adapted to dispose in a projector 200. The outer frame 120 is pivoted to the base 110 along a first axis A1 via two pivots 170. The inner frame 130 is pivotally fixed to the outer frame 120 via two pivots 170a. The inner frame 130 is disposed in the outer frame 120, further the inner frame 130 is pivotally disposed in the outer frame 120 along a second axis A2 via two pivots 170a. The second axis A2 is perpendicular to the first axis A1. The transparent element 140 is disposed in the inner frame 130, and the transparent element 140 is for example, made of flat glass or transparent plastic.

The two first coil portions 150 are respectively disposed between the base 110 and the outer frame 120 and locate at two opposite sides of the outer frame 120 along the second axis A2. The two first magnetic portions 160 are respectively disposed between the base 110 and the outer frame 120 and locate at two opposite sides of the outer frame 120 along the second axis A2. Each of the two first magnetic portions 160 is spaced with the corresponding the two first coil portions 150.

The two second coil portions 150a are respectively disposed between the inner frame 130 and the outer frame 120 and locate at two opposite sides of the inner frame 130 along the first axis A1. The two second magnetic portions 160a are respectively disposed between the inner frame 130 and the outer frame 120 and locate at two opposite sides of the inner frame 130 along the first axis A1. Each of the two second magnetic portions 160a is spaced with the corresponding the two second coil portions 150a.

In this embodiment, the two first magnetic portions 160 are fixed to the base 110. The two first coil portions 150 are fixed to the outer frame 120. Each of the two first magnetic portions 160 is spaced with the corresponding the two first coil portions 150. The two second magnetic portions 160a are fixed to the base 110. The two second coil portions 150a are fixed to the inner frame 130. Each of the two second magnetic portions 160a is spaced with the corresponding the two second coil portions 150a.

When a power supply (not shown) is adapted to provide a current to the first coil portion 150, and each of the two first coil portions 150 is magnetized and forms an electromagnetic force with magnetic field of the corresponding first magnetic portion 160. The electromagnetic forces formed between the corresponding first coil portion 150 and first magnetic portion 160 are adapted to drive the outer frame 120, the inner frame 130 and the transparent element 140 pivotally swinging relative to the base 110 along the first axis A1. When another power supply is adapted to provide a current to the second coil portions 150a, each of the second coil portions 150a is magnetized and forms an electromagnetic force with magnetic field of the corresponding second magnetic portion 160a. The electromagnetic forces are adapted to drive the inner frame 130 and the transparent element 140 pivotally swinging relative to the outer frame 120 along the second axis A2.

In addition, the electromagnetic forces are controlled by different transmission direction of the current so as to change the swing direction of the transparent element 140. The transparent element 140 may be adapted to swing along the first axis A1. The transparent element 140 may be adapted to swing along the second axis A2. The transparent element 140 is adapted to swing along the first axis A1 and the second axis A2 in sequence. The image beam is refracted when the image beam passes through the swing transparent element 140. Thus, the resolution of the image beam is promoted.

In the exemplary embodiment, referring to FIG. 2A. Each of the two first coil portions 150 is connected to the outer frame 120, and each of the first magnetic portions 160 is connected to the base 110. Each of the two second coil portions 150a is connected to the inner frame 130, and each of the two second magnetic portions 160a is connected to the base 110.

In another embodiment, referring to FIG. 2B. Each of the two first coil portions 150 is connected to the base 110, and each of the two first magnetic portions 160 is connected to the outer frame 120. Wherein each of the two second coil portions 150a is connected to the base 110, and each of the two second magnetic portions 160a is connected to the inner frame 130.

Figure 3A:
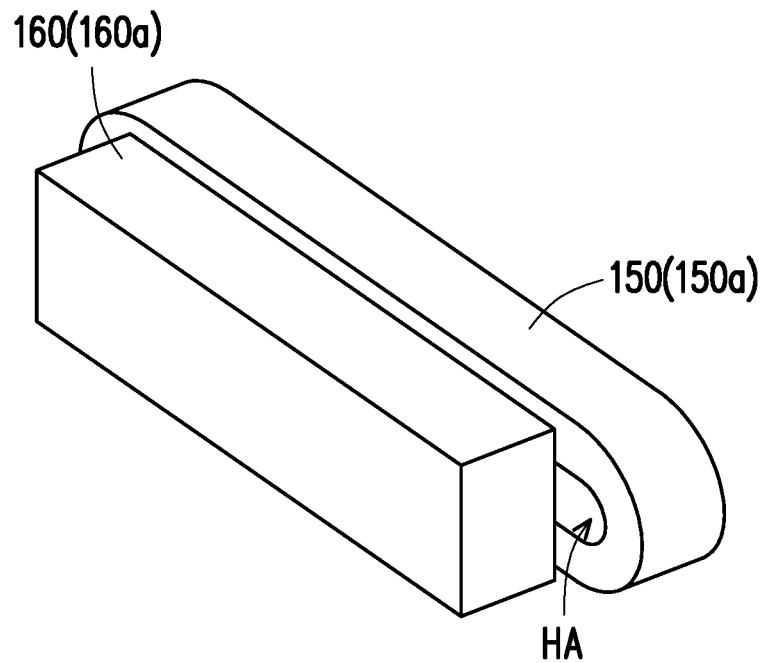
FIG. 3A illustrates a coil portion and a magnetic portion in three-dimensional schematic diagram of the optical module of FIG. 1.
Figure 3B:
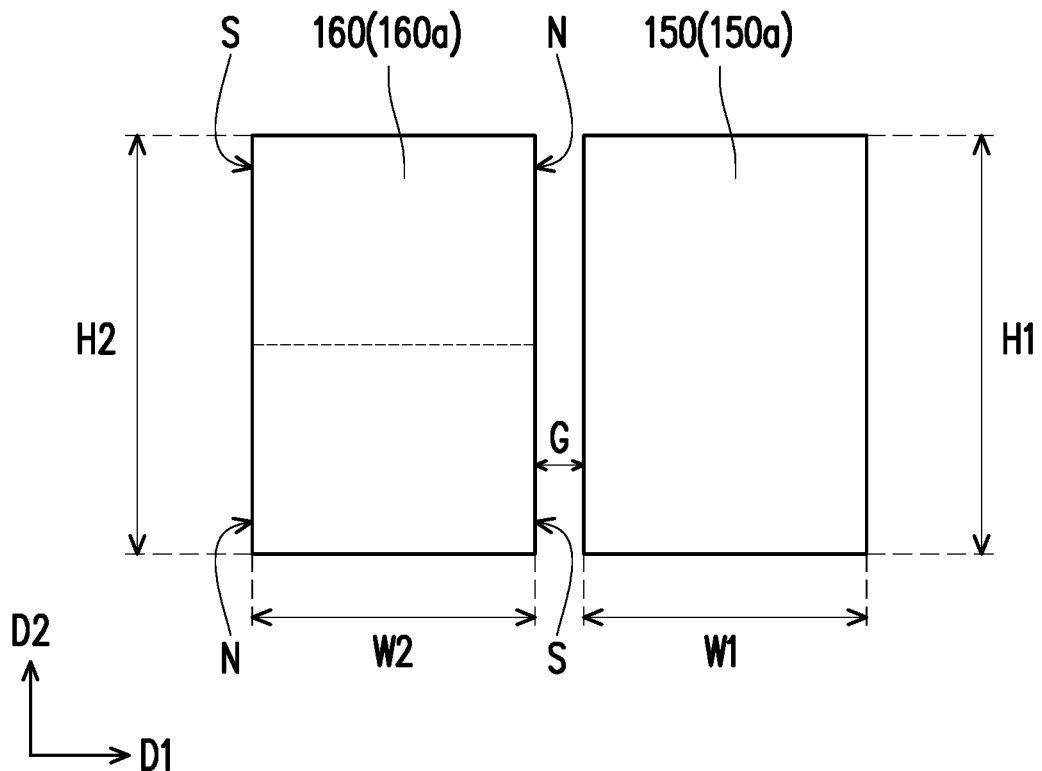
FIG. 3B illustrates a front diagram of the coil portion and the magnetic portion of FIG. 3A.

FIG. 3A illustrates a coil portion and a magnetic portion in three-dimensional schematic diagram of the optical module of FIG. 1. FIG. 3B illustrates a front diagram of the coil portion and the magnetic portion of FIG. 3A.

Referring to FIG. 3A. In the exemplary embodiment, the first coil portion 150 (second coil portion 150a) is wrapped by wires. And the first coil portion 150 (second coil portion 150a) has a hollow area HA facing the corresponding first magnetic portions 160. For example, the first magnetic portion 160 is made of magnet and has at least four magnetic poles (S, N, N, S).

The four magnetic poles are formed on two opposite surfaces of the first magnetic portion 160 (second magnetic portion 160a), the transmission direction of the magnetic field is from pole S to pole N. When the number of magnetic poles is increased, the magnetic flux density of the first magnetic portion 160 also increases, and the distance of magnetic field is decreased. On the contrary, when the number of magnetic poles is decreased, the magnetic flux density of the first magnetic portion 160 also decreases, and the distance of magnetic field is increased. It is said that the number of magnetic poles is depended on the requirement of the optical module 100.

Referring to FIG. 3B. A ratio of the widths of the corresponding first coil portion 150 (second coil portion 150a) and first magnetic portion 160 (second magnetic portion 160a) along a first direction D1 is 1:1. In detail, the first coil portion 150 (second coil portion 150a) has a width W1, and the first magnetic portion 160 (second magnetic portion 160a) has a width W2. The width W1 is for example equal to the width W2. Further, when the width W1 is equal to the width W2, the first coil portion 150 (second coil portion 150a) and first magnetic portion 160 (second magnetic portion 160a) generate the maximum electromagnetic force. The width of the first coil portion 150 (second coil portion 150a) or the width of the first magnetic portion 160 (second magnetic portion 160a) along a first direction D1 has a tolerance that is ±5%.

A ratio of the lengths of the corresponding first coil portion 150 (second coil portion 150a) and first magnetic portion 160 (second magnetic portion 160a) along a second direction D2 is 1:1. In detail, the first coil portion 150 (second coil portion 150a) has a length H1, and the first magnetic portion 160 (second magnetic portion 160a) has a length H2. The length H1 is for example equal to the length H2 to meet the design requirement of minimum volume.

A ratio of the length (H2) of first magnetic portion 160 (second magnetic portion 160a) and the width (W2) of first magnetic portion 160 (second magnetic portion 160a) is greater than 1 (H2/W2).

A gap G between the first coil portion 150 (second coil portion 150a) and first magnetic portion 160 (second magnetic portion 160a) is 0.1 mm to 0.3 mm. If the gap G is larger than 0.3 mm, the first coil portion 150 (second coil portion 150a) and first magnetic portion 160 (second magnetic portion 160a) would not generate the maximum electromagnetic force due to magnetic attenuation phenomenon.

Figure 4A:
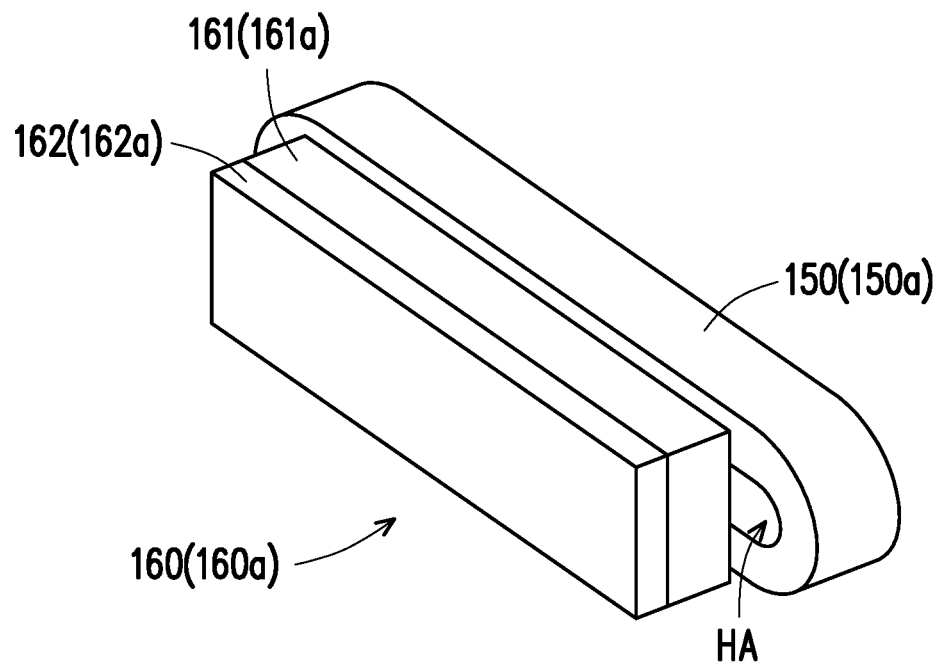
FIG. 4A illustrates a coil portion and a magnetic portion in three-dimensional schematic diagram of the optical module according to another embodiment of FIG. 2A.
Figure 4B:
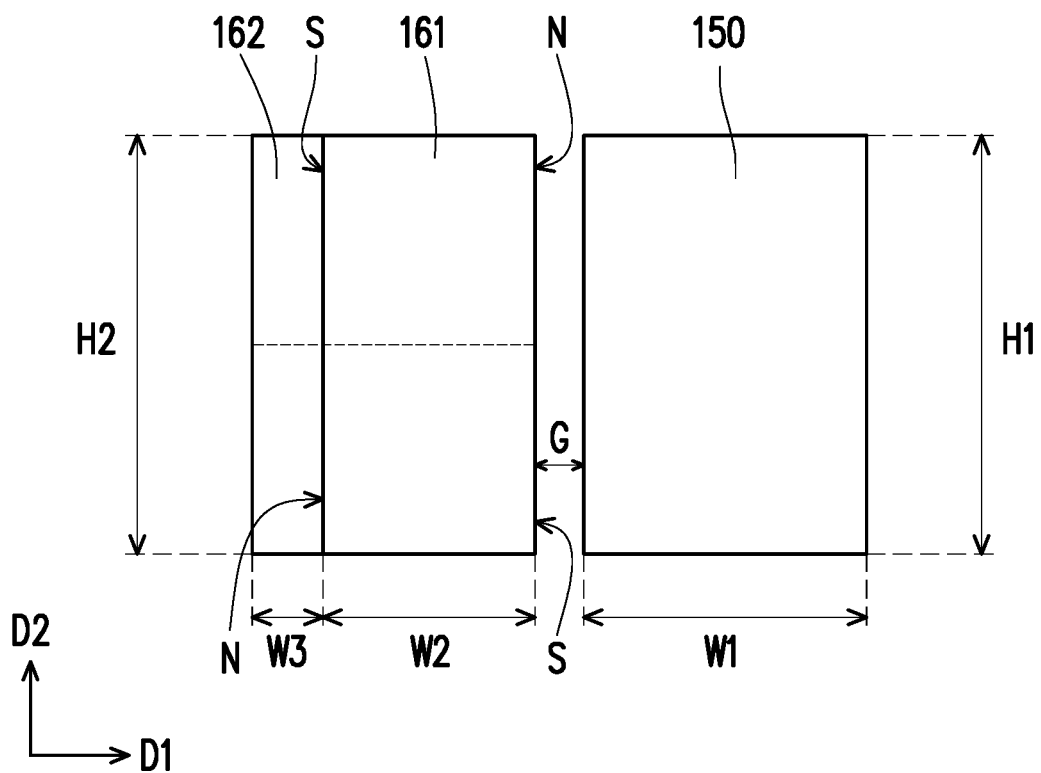
FIG. 4B illustrates a front diagram of the coil portion and the magnetic portion of FIG. 4A.

FIG. 4A illustrates a coil portion and a magnetic portion in three-dimensional schematic diagram of the optical module according to another embodiment of FIG. 2A. FIG. 4B illustrates a front diagram of the coil portion and the magnetic portion of FIG. 4A.

Referring to FIG. 4A and 4B. In another embodiment, each of the first magnetic portion 160 (second magnetic portion 160a) has a magnet 161(161a) and a concentrating flux plate 162(162a). The concentrating flux plate may be, for example, a soft magnetic material. The concentrating flux plate is disposed on a side surface of the magnet away from the corresponding the coil portion. In detail, the concentrating flux plate 162(162a) is adapted to shift the magnetic field of the magnet 161 near to the first coil portion 150 (second coil portion 150a), and the magnetic flux density acting on first coil portion 150 (second coil portion 150a) will increase.

Referring to FIG. 4B. A ratio of the widths of the first coil portion 150 (second coil portion 150a), the magnet 161 (161a), and the concentrating flux plate 162(162a) along the first direction D1 is 3:2:1. In detail, the first coil portion 150 (second coil portion 150a) has a width W1, the magnet 161(161a) has a width W2, and the concentrating flux plate162(162a) has a width W3. When the ration of widths W1, W2, W3 is 3:2:1, the first coil portion 150 (second coil portion 150a) and first magnetic portion 160 (second magnetic portion 160a) could generate the maximum electromagnetic force. The width of the magnet 161(161a) or the width of the concentrating flux plate 162(162a) along a first direction D1 has a tolerance that is ±5%.

In summary, the optical module of the invention includes two first coil portions and two first magnetic portions, and each of the first magnetic portions is spaced with the corresponding first coil portion. The first coil portion is respectively faced to corresponding first magnetic to effectively combine the first magnetic portion and the first coil portion to maximize the electromagnetic forces with low power consumption. In addition, the optical module of the invention could promote the resolution of images by swing the transparent element relative to the base, and the conventional solenoids are replaced by the coil portion and the magnetic portion to reduce the power consumption and the volume of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising:
    a base;
    an outer frame, pivoted to the base;
    an inner frame, disposed in the outer frame;
    a transparent element, disposed in the inner frame;
    two first coil portions, respectively disposed between the base and the outer frame;
    two first magnetic portions, respectively disposed between the base and the outer frame, and each of the two first magnetic portions is spaced with the corresponding first coil portion,
    two second coil portions, respectively disposed between the inner frame and the outer frame; and
    two second magnetic portions, respectively disposed between the inner frame and the outer frame, wherein each of the two second magnetic portions is spaced with the corresponding second coil portion,
    wherein when a power supply is adapted to provide a current to the two first coil portions, each of the two first coil portions is magnetized and forms an electromagnetic force with magnetic field of the corresponding first magnetic portion, and the electromagnetic forces are adapted to drive the transparent element pivotally swinging relative to the base.

2. The optical module according to claim 1, wherein each of the two first magnetic portions has a magnet and a concentrating flux plate, the concentrating flux plate is disposed on a side surface of the magnet away from the corresponding first coil portion.

3. The optical module according to claim 2, wherein a ratio of the widths of the first coil portion, the magnet, and the concentrating flux plate along a first direction is 3:2:1.

4. The optical module according to claim 1, wherein each of the two first coil portions has a hollow area facing a magnet of the corresponding first magnetic portion.

5. The optical module according to claim 1, wherein a magnet has at least four magnetic poles.

6. The optical module according to claim 1, wherein a ratio of the widths of the corresponding first coil portion and first magnetic portion along a first direction is 1:1.

7. The optical module according to claim 1, wherein a ratio of the lengths of the corresponding first coil portion and first magnetic portion along a second direction is 1:1.

8. The optical module according to claim 1, wherein each of the two first coil portions is connected to the base, and each of the two first magnetic portions is connected to the outer frame.

9. The optical module according to claim 1, wherein each of the two first coil portions is connected to the outer frame, and each of the two first magnetic portions is connected to the base.

10. The optical module according to claim 1, wherein a gap between the corresponding first magnetic portion and first coil portion is 0.1 mm to 0.3 mm.

11. The optical module according to claim 1, wherein the inner frame is pivotally disposed in the outer frame, wherein when a power supply adapted to provide a current to the second coil portion, each of the two second coil portions is magnetized and form an electromagnetic force with magnetic field of the corresponding second magnetic portion, and the electromagnetic forces are adapted to drive the inner frame and the transparent element pivotally swinging relative to the outer frame.

12. The optical module according to claim 11, wherein each of the two second magnetic portions has a magnet and a concentrating flux plate, the concentrating flux plate is disposed on a side surface of the magnet away from the corresponding second coil portion.

13. The optical module according to claim 11, wherein a ratio of the widths of the second coil portion, the magnet, and the concentrating flux plate is 3:2:1.

14. The optical module according to claim 11, wherein each of the two second coil portions has a hollow area facing the magnet of the corresponding second magnetic portion.

15. The optical module according to claim 1, wherein a ratio of the widths of the corresponding second coil portion and second magnetic portion along a first direction is 1:1.

16. The optical module according to claim 1, wherein a ratio of the lengths of the corresponding second coil portion and second magnetic portion along a second direction is 1:1.

17. The optical module according to claim 1, wherein each of the two second coil portions is connected to the inner frame, and each of the two second magnetic portions is connected to the base.

18. The optical module according to claim 1, wherein each of the two second coil portions is connected to the base, and each of the two second magnetic portions is connected to the inner frame.

19. A projector, comprising:
    a light source, adapted to provide an illumination beam;
    a light valve, located on a transmission path of the illumination beam, adapted to transform the illumination beam into an image beam;
    a projecting lens, located on a transmission path of the image beam, adapted to project the image beam; and
    an optical module, disposed between the light valve and the projecting lens, comprising:
    a base;
    an outer frame, pivoted to the base;
    an inner frame, disposed in the outer frame;
    a transparent element, disposed in the inner frame;
    two first coil portions, respectively disposed between the base and the outer frame;
    two first magnetic portions, respectively disposed between the base and the outer frame, and each of the two first magnetic portions is spaced with the corresponding first coil portion,
    two second coil portions, respectively disposed between the inner frame and the outer frame; and
    two second magnetic portions, respectively disposed between the inner frame and the outer frame, wherein each of the two second magnetic portions is spaced with the corresponding second coil portion, wherein when a power supply is adapted to provide a current to the two first coil portions, each of the two first coil portions is magnetized and forms an electromagnetic force with magnetic field of the corresponding first magnetic portion, and the electromagnetic forces are adapted to drive the transparent element pivotally swinging relative to the base.

\* \* \* \* \*